United States Patent

[11] 3,599,598

[72] Inventor Philip M. Banner
 28 Oxford Road, Massapequa, N.Y. 11758
[21] Appl. No. 18,821
[22] Filed Mar. 12, 1970
[45] Patented Aug. 17, 1971

[54] MAGNETIC BEARING INDICATOR
 3 Claims, 2 Drawing Figs.
[52] U.S. Cl. .................................................. 116/130,
 33/224, 235/61 NV
[51] Int. Cl. .................................................. G08c 5/00,
 G01c 17/38
[50] Field of Search ........................................... 235/61 NV,
 70, 89; 33/224; 35/10.2

[56] References Cited
UNITED STATES PATENTS
2,389,369 11/1945 Kittleson ..................... 33/111
2,904,885 9/1959 Wood, Sr. ..................... 235/61 X
3,209,999 10/1965 Carney ......................... 235/70
3,315,887 4/1967 Martin, Jr. .................... 235/61

FOREIGN PATENTS
514,963 12/1930 Germany ....................... 33/224
 5 1/1873 Great Britain ................. 33/224
 11,213 9/1885 Great Britain ................. 33/224

Primary Examiner—Richard B. Wilkinson
Assistant Examiner—Stanley A. Wal
Attorney—James P. Malone ABSTRACT: A navigational computer for obtaining true bearing from magnetic compass information. The device has a compass bearing scale and a magnetic bearing scale. Magnetic deviation pointers for a representative number of bearings for the particular craft are previously attached to correlate the two scales. In use the compass reading is easily translated to magnetic bearing. A movable cursor is then moved from the magnetic reading to set in magnetic variation for the locality. The final reading under the cursor hairline is True Bearing.

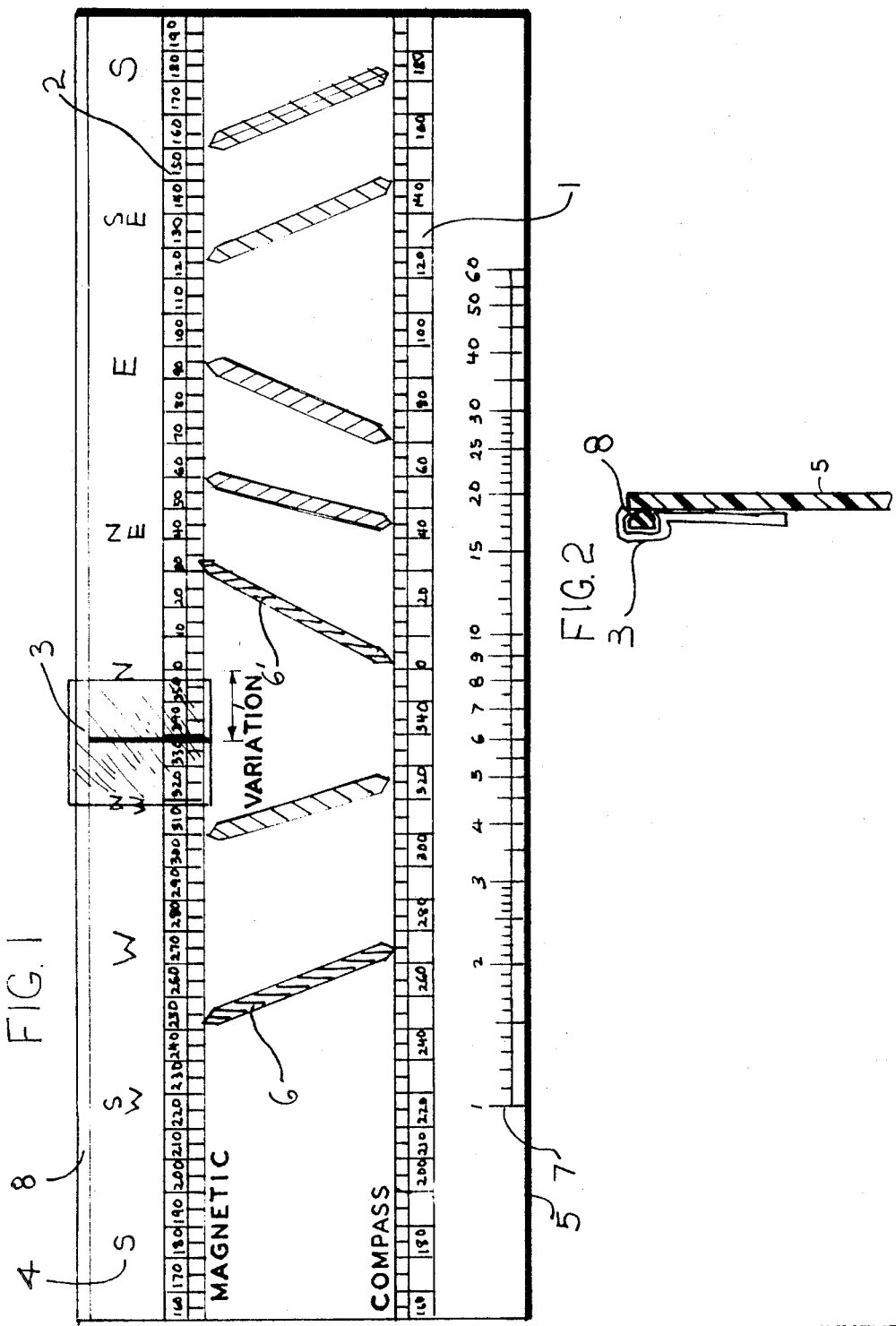
PATENTED AUG 17 1971 3,599,598
INVENTOR.
PHILIP M. BANNER

MAGNETIC BEARING INDICATOR

This invention relates to a deviation finder and it particularly relates to a nautical magnetic compass deviation finder which may be used by amateurs or professionals in conjunction with finding and recording deviation data.

It is an object of this invention to provide a new and improved method to marine craft or aircraft, particularly small boats, in inland or offshore water who need this type of information to accurately determine the proper direction of travel without having to refer to books or charts that are removed from the navigational area, or are too complex to offer immediate remedial information. It has been designed to facilitate rapid reading of any deviation on a horizontal chart, made of nonmagnetic materials which will not influence the placement near a magnetic compass.

It is an object of the invention to place this novel plastic device near a pinnacle or on top of a windshield near the pilot, so that he can use the finder at all times. Too often, the operation of high-speed equipment leaves little time for critical decisions involving direction that necessitate immediate decision. This finder records the information of deviation, a subject of paramount importance to navigators at all times. In addition to finding and storing deviations of the magnetic compass, this invention also assists the navigator with a variation hairline cursor device, and a readout of degrees as to the amount of variation for compass correction. Another feature is a logarithmic speed scale.

This deviation calculator contains the most important elements of navigation a pilot must have, such as deviation and variation of the magnetic compass. In the present art of finding deviation, navigators refer to the Napier chart or perhaps purchase compass deviation cards, neither of which will compare with this invention, as I will point out. Usually, the deviation factors are recorded on Napier charts or compass cards as the navigator finds each deviation. In time, the card is all marked up, it is unsightly, unusable for clarity, and it is made so that it can be replaced.

Deviation influence on magnetic compasses involve the polar deviation factors, or influences within the ship, such as the wrong type of compass on a boat, an airplane compass, chrome plating causing a magnetic field, steel or electric welding near the compass, improper installation of electrical equipment near the compass, untwisted or shorted wiring, improper storage procedures, paint cans, pocket knives, small keys or even nylon clothing may introduce an error; also the earth's magnetic field, the positioning of engines or of the place to install a compass. These are all regarded as deviation factors where there is such great difference between the magnetic compass and the magnetic bearing.

An object of this invention is to provide navigational data on variation such as found upon navigational charts. When the navigator finds the variation, he places the hairline cursor over the top scale at a point in degrees to show the exact difference between true and magnetic bearing. The angle between geographic and magnetic meridian, compass error and variation are the same. The three methods by which bearings may be expressed are:

1. True—When they refer to the North Pole.
2. Magnetic—When they refer to the north magnetic pole. To change magnetic courses to true courses, the former must be corrected for variation.
3. Compass—When they refer to the particular boat compass on each particular heading and must be corrected for both deviation and variation for conversion to true bearings or true courses.

Variation differs with locality and the navigator must take into account the change in variation as he proceeds upon the voyage. An aviator departing from Florida to Nova Scotia, or a ship would, if they failed to take the change in variation into consideration, find themselves in the woods of Maine instead of Nova Scotia. In piloting and small boat handling, the mariner finds upon the chart not only the value of the variation, but the rate, the amount and direction of the annual change given upon the compass rose.

This invention shows the variation on a 360° nautical scale and has two similar scales representing compass and magnetic bearings that operate by means of newly designed colored nonmagnetic or magnetic pointers that are removable and movable to any position required to show deviation of each given point of the magnetic compass. These pointers will have a self-adhering quality by having a sticky surface to fasten it on. Therefore, this invention will be more of a permanent nature, attached to a part of the boat offering visual detection and will serve the navigator as an easy method of correcting various deviation in different headings of the boat or other craft. This easy method will encourage navigators to find the answers and easily place the deviation pointers where they belong on the center scale. No pencils or writing are required. No round charts or surfaces that could not be placed next to the compass or on top of a window area are required. The horizontal compass scales offer uncomplicated readout of information and this plastic invention can be fastened down with screws for permanent use.

An object of the invention is to provide an improved deviation calculator, intimately associated with the art of navigation, to improve upon old methods. It is presented in the interest of modern navigational needs, safety, improved teaching purposes, compactness, practicability, simplicity, reliability, which may readily be used by a layman as well as a skilled navigator.

These and other important features of the invention will now be described in detail in the following specification and then pointed out more particularly in the summary and appended claims.

In the drawings:

FIG. 1 represents a plan view of the deviation calculator.

FIG. 2 is a sectional side view of the variation cursor attachment to the plastic base.

Referring to FIG. 1, there is shown the developed compass scale 1 printed on base 5 with 360° such as found on boat magnetic compasses, and the magnetic bearing scale 2 which corrects the compass course. The hairline cursor 3 is movably mounted on plastic bevelled edge 8 of base B, designed like a slide rule to permit movement and, therefore, show variation. Scale 4 represents the cardinal and intercardinal points of the scales 1 and 2 placed appropriately according to their value on a 360° scale. Base 5 has a rectangular shape and has the cardinal points 4 and scales—the compass scale 1, the magnetic scale 2, and the logarithmic speed scale 7. Movable pointers 6, 6' with adhesive backs have points on both ends so as to efficiently show the degrees pointed to at each end, allowing simple calculation. The plastic runner 8' is attached to the base member 5 allowing the cursor to operate on a track.

FIG. 2 shows a sectional view of the hairline variation cursor 3. The rectangular base 5 may consist of transparent or painted plastic materials resistant to the effect of salt water, air, consistent with appropriate standards of manufacturing. It can be made of plastic, wood, nonmagnetic or magnetic metals, etc.

The data for the deviating pointers must be obtained by calibrating the compass. This is done by taking various compass bearings over a full 360° range on landmarks, the true or magnetic bearings of which are known. From this data, the deviating pointers can be drawn on or attached to base 5 to correlate the two scales.

Then when the compass is read, the compass bearing is easily translated at a glance.

Variation for the particular region is obtained from standard navigation maps.

In using the marine navigational calculator, the hairline cursor 3 is set over the magnetic bearing scale 2, such as found on charts and used to offset the amount of degrees between magnetic north and true north. Next important operation is to correct for deviation by noting the deviation pointers 6 between the compass scale 1 and the magnetic bearing scale 2. To change a deviation pointer 6 it can be removed and used over and over, almost indefinitely. The pointers 6 provide a complete picture of deviation on an easy to read horizontal base 5 with colored pointers 6 on a contrasting base 5. A translucent paint on the pointers 6 would aid nighttime readings. A conventional logarithmic speed scale 7 is provided. By placing a ruler or divider over the factors of nautical miles run and minutes run and without changing the divider spread, you place the right point on 60 and the left point will then indicate speed in knots. Such logarithmic scales 7 are found on charts as Nautical Chart 120 SC by the U.S. Department of Commerce, Washington D.C.

This deviation calculator offers a novel method of using pointers that are movable, employing a horizontal version of the compass rose, with opposing charts so located so as to facilitate any amateur to immediately understand its functions. This deviation calculator could be very useful, not only for actual navigation, but for instructional purposes on land. This deviation calculator when used in conjunction with magnetic compass equipment, will valuably assist every navigator in performing the task of safe journey.

Referring to FIG. 1, a typical problem is as follows:

Problem: Find compass course to destination having true bearing of 240°.
1. Determine variation from chart as +12°.
2. Set cursor on 240°+12°=252°.

And: Deviation pointer 6 indicates compass bearing 265°.

I claim:
1. A navigational computer having a base,
   a first compass bearing scale horizontally disposed on said base,
   a second magnetic bearing scale disposed on said base parallel to said compass bearing scale,
   a plurality of removably mounted magnetic deviation indicator members each connecting preselected points on said first and second scales.
2. Apparatus as in claim 1 having a cursor movable along said magnetic scale to indicate magnetic variation with respect to said magnetic reading.
3. Apparatus as in claim 1 wherein said deviation indicators comprise a plurality of double-ended pointers.